Patented Mar. 23, 1943

2,314,335

UNITED STATES PATENT OFFICE 2,314,335

HYDROCARBON DERIVATIVE

Frederick E. Frey, Bartlesville, Okla., assignor to Phillips Petroleum Company, a corporation of Delaware No Drawing. Application March 28, 1939, Serial No. 264,650

19 Claims. (Cl. 260—662)

This invention relates to improvements in the production of derivatives of paraffin hydrocarbons. It relates especially to derivatives of paraffin hydrocarbons containing a quaternary carbon atom, that is, with the structure $CR_4$, where R may be any alkyl group, and more specifically to derivatives of these compounds in which at least one of the R's is a methyl group.

An object of my invention is to produce paraffin halides and dihalides wherein the halogen is held by a carbon atom directly attached to a quaternary carbon atom, which are designated neoparaffin halides hereafter.

A further object is the production of alcohols and esters, such as acetates, with the hydroxyl group or ester linkage attached to a carbon atom directly attached to a quaternary carbon atom.

A still further object is the preparation of olefins containing the group $CR_3$, and derivatives of such olefins.

Still another object is the production of large quantities of neoalkyl chlorides, and the like, of a high degree of purity without expensive and tedious close fractional distillation of large quantities of material.

Still further objects and advantages will become apparent as this discussion and disclosure proceed.

Alkyl halides have found considerable industrial use as solvents, and their fields of application are being broadened continually. These compounds are not only extensively used as such, but they are also intermediate compounds in the formation of alcohols, esters, ethers and other such compounds from hydrocarbons. Of the alkyl halides used, the alkyl chlorides, or chloroparaffins, have found the largest and widest industrial application. This is partly true because chlorine is abundant and inexpensive, and is easier to handle than others of the halogens. However, the other alkyl halides are similar in their chemical characteristics, although their physical characteristics such as their boiling points often differ widely, and they may be prepared in analogous manners. For the sake of expediency, hereinafter reference will be made more particularly to the alkyl chlorides and their formation and chemical reactions, but it is to be understood that the other halides and halogens are not to be disregarded, and are included in the broadest conceptions of this invention.

Any number of hydrogen atoms in a hydrocarbon may be substituted for by a halogen, such as by chlorine. With a few exceptions, however, it is the mono- and di- substituted paraffins which are of greatest interest, and it is with these that my invention is concerned. Considering the mono- substituted halogens, it is well known that, in any series of compounds such as the alkyl chlorides, there are three types. Although many characteristics of such a series are common to all three types, each type has characteristics which serve to differentiate it from the others. These three types are (1) primary, (2) secondary and (3) tertiary compounds, in which the halogen is directly attached to a carbon atom which in turn is directly attached to one, two and three other carbon atoms, respectively. Of these various types of halides the primary alkyl halides are generally considered most desirable, for reasons which need not be elaborated here, while the secondary and tertiary compounds are considered less desirable. Thus, not only are primary alkyl halides more stable during use, but derivatives such as alcohols and esters are the least readily decomposed while they are in use.

There are a number of paraffin hydrocarbons from which only primary halides can be formed. Among these may be listed such paraffins as methane ($CH_4$), ethane ($C_2H_6$), neopentane (($CH_3$)$_4C$) and neooctane (($CH_3$)$_3CC(CH_3)_3$). From other paraffins, such as isopentane $$(CH_3)_2CHCH_2CH_3$$

there may be produced four monohalides, for example two primary chlorides

and (($CH_3$)$_2CHCH_2CH_2Cl$), a secondary chloride (($CH_3$)$_2CHCHClCH_3$) and a tertiary chloride (($CH_3$)$_2CClCH_2CH_3$), and it has been well established that, in any method of producing one of these directly by the chlorination of isopentane, large proportions of the others are also produced. The chemical and physical properties of these compounds are such that they are not readily separated, one from the other, and it is difficult to isolate large quantities of either of the two monochlorides in a pure state.

As has previously been stated, the primary monochlorides find a larger and wider commercial application. I have found that the neoalkyl halides, that is the primary halides in which the halogen is attached to a carbon atom which in turn is one of four carbon atoms attached to still another carbon atom such as neopentyl chloride ($CH_2ClC(CH_3)_3$), neohexyl chloride

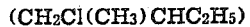

isoneoheptyl chloride ($CH_2Cl(CH_3)_2CCH(CH_3)_2$), n-neoheptyl chloride (CH$_2$Cl(CH$_3$)$_2$C(CH$_3$)$_2$CH$_3$) and the like appear to be unique among themselves, of the primary halides, and are extremely stable and resistant to hydrolysis and decomposition. It will be noted that all of these compounds have a halogen attached to a primary carbon atom which is directly attached to quaternary carbon, that is, they all have the formula CH$_2$XCR$_3$, where X is a halogen, in this case chlorine, and R is an alkyl group.

Although only one monochloride is possible upon the chlorination of neopentane, there are a number of monochlorides possible from the chlorination of neohexane, isoneoheptane, n-neoheptane and the like. The various monochlorides possible from any one such paraffin have boiling points quite close to each other and to other compounds which might be present as impurities. Fractional distillation is one of the most economical and generally used methods of separation, but is often difficult or impracticable due to the presence of overlapping distilling temperatures among the isomeric chlorides obtained from a chlorination step.

I have now found a novel process for preparing, from neoparaffins, neoalkyl halides in a pure form, and free of other halides which are isomeric with the desired neoalkyl halides and which have closely adjacent boiling points. In practicing my process I first treat a neoparaffin in a pure or relatively concentrated form with a halogen such as chlorine. Although the neoparaffins are not naturally plentiful or to be found in concentrated form, they may be prepared in such a form, or isolated in a high degree of purity, by the process such as is described in the copending application of Frey and Hepp, Serial Number 106,482, filed October 19, 1936, now U. S. Patent No. 2,209,450, granted July 30, 1940. The halogenation may be carried out by methods known to the art, such as thermal reaction, or in the presence of catalysts, or under the influence of actinic light. In any case, the halogen reacts with the paraffin by substitution, substituting for one or more hydrogen atoms in the molecule, the hydrogen so substituted forming hydrogen halide. The neoparaffin is preferably present in large excess, relative to halogen, and the use of high temperatures up to about 700° C. and either low pressures or high pressures up to 2,000 pounds per square inch or more with short reaction times of the order of a fraction of a second up to about 60 seconds are suitable, with operation in the lower part of this range being preferred. Under these conditions the formation of polyhalides is restricted, and larger proportions of primary substitutions take place. When treating neoparaffins such as neohexane or isoneoheptane in this manner, not only are secondary and tertiary monohalides produced, but also primary monohalides other than the desired neoalkyl halides. Thus, considering only monosubstitution products, a primary hexyl chloride with the formula (CH$_3$)$_3$CCH$_2$CH$_2$Cl may also be prepared by the chlorination of neohexane as well as the secondary chloride

((CH$_3$)$_3$CCHClCH$_3$)

and the desired neohexylchloride

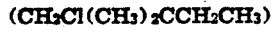
(CH$_2$Cl(CH$_3$)$_2$CCH$_2$CH$_3$)

and a primary heptyl chloride with the formula (CH$_3$)$_3$CCH(CH$_3$)CH$_2$Cl may be prepared by the chlorination of isoneoheptane as well as the tertiary chloride and the desired isoneoheptylchloride. While other substitution products containing more halogen atoms may be formed at the same time under the preferred operating conditions discussed they are formed only in small amounts, and they generally have a considerably higher boiling point and can be separated readily from the resulting mixture by distillation. These various isomeric monohalides are not widely different in boiling points, and there has not been proposed any method by which the neoalkyl halides may be separated from their isomers and other alkyl halides of adjacent boiling points.

I am now able to accomplish such a separation and purification by subjecting a mixture containing neoalkyl halides and other halides to elevated temperatures for a limited period of time. I prefer to do this in the presence of a catalyst, although this is not necessary in every case. Temperatures which I may use are generally above about 175° C., but I prefer not to use temperatures in excess of about 700° C. The pressure may be in the neighborhood of atmospheric or higher. As catalysts I may employ natural earths such as bauxite and kaolin, metallic oxides such as alumina, thoria and zirconia, and salts such as barium chloride, calcium chloride, calcium phosphate and ferric chloride and the like, either alone or deposited on various supports such as silica gel, pumice, charcoal and the like, or in fact any of the catalytic substances which are capable of effecting elision of HCl between two adjacent carbon atoms, one carrying hydrogen and the other halogen. I have found that catalysts capable of effecting elision of hydrogen chloride between two adjacent carbon atoms and selected from the oxides of metals of the third and fourth groups and of the halides of the calcium sub group of the second group of the periodic table can be particularly effective for use as catalysts in the presence of my invention. When using such catalysts, I am generally able to operate successfully in the lower part of the indicated temperature range, such as between 175° and 500° C. The exact reaction time and temperature giving most complete destruction of other than neoalkylhalides with minimum loss of neoalkylhalide are readily determined by trial. In subjecting a mixture containing neoalkyl halides and other halides to the process of my invention, a hydrogen halide, such as hydrogen chloride, is split out from the alkyl halides which are present in such a mixture, with the exception of the neoalkylhalides. The neoalkylhalides are unaffected under the conditions of operation, and can be recovered in a relatively pure form, depending only upon the degree of purity desired. The other alkyl halides, from which hydrogen halide is split out, are thus transformed into olefins of the same number of carbon atoms. These olefins generally have a highly branched character, and may be quite valuable compounds themselves, so that my invention may be practiced to form such olefins as well. Thus, from neohexane I may produce an olefin of the formula (CH$_3$)$_3$C—CH=CH$_2$, from isoneoheptane an olefin of the formula (CH$_3$)$_3$C—C(CH$_3$)=CH$_2$, etc.

Not only does the practice of my invention produce the neoalkyl halides in a pure state free of those isomeric alkyl halides resulting from the halogenation of the same paraffin, but in the same manner I am able to remove the halides which may have been produced from closely related hydrocarbons. Thus, if it should so happen that some normal hexane, or other isohexanes, are present in crude neohexane or a neohexane concentrate, these would also be halogenated in any halogenation process, and the resulting alkyl halides other than the neoalkyl halides can be removed by my process. In the same way, although only a neoalkylhalide can be produced from the halogenation of neopentane or of neooctane, these paraffins in a crude state may have associated with them as impurities other paraffins of approximately the same boiling point. Such a crude mixture or concentrate can be halogenated as described, and the neopentylhalide, or neooctylhalide may then be obtained in a pure state by the elimination of the undesired halides in accordance with my invention.

After treating a mixture of alkyl halides containing neoalkyl halides in accordance with this disclosure, the olefins and hydrogen halide so produced are easily separated from the remaining alkyl halide. This may be done by simple distillation since the boiling point of the alkyl halide is so much higher than these other constituents. If desired the hydrogen halide may be removed by means of a caustic wash or other equivalent chemical means.

As an example of the operation of my process neohexane (2,2-dimethylbutane) can be reacted with chlorine by separately heating them both to a temperature of about 450° C., intimately mixing them and shock cooling the resultant mixture after a reaction period of about 7 seconds. This is conveniently done with an excess of neohexane which inhibits over-reaction and the formation of polychlorides. Such an excess is represented by a molar ratio of hydrocarbon to chlorine of about 3:1 although higher excesses are often used. The three possible monochlorides produced are present in about the ratio given in Table I.

Table I

| | Per cent |
|---|---|
| A. $CH_2Cl(CH_3)_2CCH_2CH_3$ | 55 |
| B. $(CH_3)_3CCH_2CH_2Cl$ | 19 |
| C. $(CH_3)_3CCHClCH_3$ | 26 |
| | 100 |

A fraction boiling between 110° and 130° C. containing these three hexylmonochlorides is easily separated from the total effluents, and a fraction representing unreacted neohexane is returned to be mixed with fresh hydrocarbon coming to the process. The monochloride fraction is then passed over a catalyst comprised of calcium chloride at a temperature of about 250° C. The effluents contain practically all the neohexylchloride ($CH_2Cl(CH_3)_2CCH_2CH_3$) which has been unaffected, and somewhat smaller amounts of $(CH_3)_3CCH=CH_2$, which has been formed from compounds B and C of Table I, as well as large amounts of HCl. Because of the wide difference in boiling points between the neohexylchloride and the neohexylene (boiling point 41.2° C.) these effluents are readily separated in commercially pure fractions. The HCl may be removed by fractionation, or by a caustic wash before or after the distillation just mentioned.

In a similar manner isoneoheptylchloride ($CH_2Cl(CH_3)_2C$—$CH(CH_3)_2$) is prepared in a commercially pure state from isoneoheptane ($(CH_3)_3C$—$CH(CH_3)_2$). When isoneoheptane is chlorinated isoneoheptylchloride is about 50 per cent of the total heptylmonochlorides formed, that is, the yield is slightly less than the yield of neohexylchloride. In the same manner the other two heptanes containing quaternary carbon atom, $(CH_3)_3C(CH_2)_2CH_3$ and $(CH_3)_2C(C_2H_5)_2$ may be treated in accordance with my invention, forming $CH_2Cl(CH_3)_2C(CH_2)_2CH_3$ and $CH_2Cl(CH_3)C(C_2H_5)_2$ respectively and various heptylenes, but the yields of the desired neoalkylchlorides will be only about 35 per cent and 25 per cent respectively of the neoheptanes reacted.

The term "neoalkylhalide" is used herein to designate the primary halogen substitution products of those paraffins which have the structure $CH_3CR_3$, where R is any alkyl group, such as methyl, ethyl, normal propyl, isopropyl and the like, and where the substitution has taken place on the methyl group indicated, that is, compounds of the general formula $CH_2XCR_3$, where X is a halogen atom. Although quite high molecular weight compounds may have this structure, high yields of desirable products in a substantially pure state are difficult to obtain where any of the alkyl groups represented by R has more than four carbon atoms. It is further preferable, although not absolutely necessary, that one or two of the alkyl groups represented by R be methyl groups, that is, that the paraffins originally treated have the general formula $(CH_3)_2CR_2$ or $(CH_3)_3CR$. Those alkyl halides which do not come within the classification of "neoalkyl halides" such as $(CH_3)_3CCH_2CH_2X$, normal hexyl halides and the like are removed from the neoalkyl halides by my process.

Furthermore, a neoalkyl halide or neoparaffin monohalide of the type $CH_2X(CH_3)CR_2$ which has been formed and purified as disclosed may be subjected to further halogenation, so that another halogen atom will enter into the molecule, forming neoparaffin dihalides of the type $(CH_2Cl)_2CR_2$ along with other halides, and this compound may be obtained in a substantially pure form by a catalytic treatment for elison of hydrogen halide exactly similar to that disclosed for the purification of the neoalkyl monohalides. Dihalides of the type $CHCl_2CR_3$ may also be formed, but under halogenation conditions pointed out as being preferable, such compounds are formed only in minor amounts.

The purified neoalkyl halides and neoparaffin dihalides which are produced in a pure state by my process may be used as such, or they may be converted into alcohols, ethers, esters and the like, by means well known for such conversions. The derivatives thus formed are also essentially in a pure state, and have properties which render them superior over isomeric compound of the same molecular weight as the neoalkyl halides are superior over isomeric alkyl halides.

I claim:

1. A process for producing derivatives of paraffin hydrocarbons which comprises treating a paraffin of the type $CH_3CR_3$, where each R is any alkyl group of not more than four carbon atoms, with an elementary halogen whereby a substitution of halogen for hydrogen takes place forming isomeric alkyl halides, treating said alkyl halides so formed at a temperature between 175° and 700° C. for a period of time such that olefins and hydrogen halide are formed and alkyl halides of the type $CH_2XCR_3$, wherein X is a halogen, are relatively unaffected, and separating from the products of said treatment said olefins and hydrogen halide so produced.

2. In a process for producing derivatives of paraffin hydrocarbons wherein paraffin hydrocarbons are treated by halogens producing halogen substitution products, the steps which comprise treating a hydrocarbon material comprising essentially a paraffin of the group $CH_3CR_3$, where each R is any alkyl group of not more than four carbon atoms, with an elementary halogen whereby a substitution of halogen for hydrogen takes place forming alkyl halides, treating at least a portion of the halides so formed at a temperature of 175° to 500° C. in the presence of a catalyst for a period of time such that alkyl halides of the type $CH_2XCR_3$ where X is a halogen, are relatively unaffected and other alkyl halides are decomposed forming olefins and a hydrogen halide, and separating from the products of the treatment the olefins and hydrogen halide so produced.

3. A process for preparing neopentyl chloride in a relatively pure state which comprises treating a paraffinic hydrocarbon material of a narrow boiling range and comprising predominantly neopentane with elementary chlorine under such conditions that alkyl monochlorides are formed, treating at least a portion of said alkyl monochlorides at a temperature between 175° and 700° C. for a period of time such that neopentylchloride is substantially unaffected and other alkyl chlorides are decomposed forming olefins and hydrogen chloride, and separating from the products of said treatment the said olefins and hydrogen chloride so produced.

4. A process for preparing neoheptyl chloride in a relatively pure state which comprises treating a hydrocarbon material comprising essentially neoheptanes with elementary chlorine under such conditions that alkyl monochlorides are formed, treating at least a portion of said alkyl monochlorides at a temperature between 175° and 700° C. for a period of time such that neoheptylchlorides of the group $CH_2ClCR_3$, where R is an alkyl group, is substantially unaffected and other alkyl chlorides are decomposed forming olefins and hydrogen chloride, and separating from the products of said treatment the said olefins and hydrogen chloride so produced.

5. In a process for producing derivatives of paraffin hydrocarbons in which a paraffin of the type $CH_3CR_3$, where each R is any alkyl group of not more than four carbon atoms, is treated with an elementary halogen to form isomeric alkyl halides by substitution of halogen for hydrogen, the improvement which comprises treating said alkyl halides so formed at a temperature between 175 and 700° C. for a period of time such that olefins and hydrogen halide are formed and alkyl halides of the type $CH_2XCR_3$, wherein X is a halogen, are relatively unaffected, and separating from the products of said treatment said olefins and hydrogen halide so produced.

6. The process as set forth in claim 5 wherein the halogen is chlorine.

7. In a process for producing derivatives of paraffin hydrocarbons wherein paraffin hydrocarbons are treated by an elementary halogen to produce halogen substitution products, the steps which comprise treating a paraffinic hydrocarbon material of a narrow boiling range and comprising predominantly a paraffin of the type $CH_3CR_3$, where each R is any alkyl group of not more than four carbon atoms, with an elementary halogen to form alkyl halides by the substitution of halogen for hydrogen, treating at least a portion of the halides so formed at a temperature between 175–700° C., for a period of time such that alkyl halides of the type $CH_2XCR_3$, wherein X is a halogen, are relatively unaffected such that olefins and hydrogen halide are formed from ordinary alkyl halides, and separating from the products of said treatment the said olefins and hydrogen halide so produced.

8. The process according to claim 7 wherein the halogen is chlorine.

9. In a process for obtaining an alkyl halide of the type $CH_2XCR_3$ wherein X is a halogen and each R is any alkyl group of not more than four carbon atoms, in a relatively pure state, the steps which comprise treating a paraffinic hydrocarbon material of a narrow boiling range and comprising predominantly a paraffin of the group $CH_3CR_3$ with an elementary halogen to form alkyl halides by the substitution of halogen for hydrogen, treating the alkyl halides so formed at a temperature between 175 and 700° C. for a period of time such that the alkyl halides of the group $CH_2XCR_3$ are relatively unaffected and such that other alkyl halides are decomposed to form olefins and hyrogen halide, and separating from the products of said treatment the said olefins and hydrogen halide so produced.

10. A process according to claim 9 wherein the halogen is chlorine.

11. In a process for producing derivatives of paraffin hydrocarbons wherein paraffin hyrocarbons are treated by halogens producing halogen substitution products, the steps which comprise treating a paraffinic hydrocarbon material of a narrow boiling range and comprising predominantly a parffin of the type $CH_3CR_3$ where each R is any alkyl group of not more than four carbon atoms, with an elementary halogen to form alkyl halides by substitution of halogen for hydrogen, treating at least a portion of the alkyl halides so formed at a temperature between 175 and 500° C. in the presence of a solid catalytic substance capable of effecting elison of hydrogen chloride between two adjacent carbon atoms, for a period of time such that alkyl halides of the group $CH_2XCR_3$ are relatively unaffected and such that other alkyl halides are decomposed to form olefins and hydrogen halide, and separating from the products of the treatment the olefins and hydrogen halide so produced.

12. The process according to claim 11 in which the halogen is chlorine.

13. A process for preparing neohexyl chloride in a relatively pure state which comprises treating a paraffinic hydrocarbon material of a narrow boiling range and comprising predominantly neohexane with elementary chlorine under such conditions that alkyl monochlorides are formed, treating at least a portion of said alkyl monochlorides at a temperature between 175° and 700° C. for a period of time such that the neohexyl chloride $CH_2Cl(CH_3)_2CCH_2CH_3$ is substantially unaffected and other alkyl chlorides are decomposed forming olefins and hydrogen chloride, and separating from the products of said treatment the said olefins and hyrogen chloride so produced.

14. A process for producing derivatives of paraffin hydrocarbons, which comprises treating a paraffinic hydrocarbon material of a narrow boiling range and comprising predominantly a neoparaffin of the type $CH_3CR_3$, where each R is any alkyl group of not more than four carbon atoms, with chlorine to form alkyl chlorides by substitution of chlorine for hydrogen, treating at least a portion of the alkyl chlorides so formed at a temperature and for a period of time adapted to decompose other alkyl chlorides present forming olefins and hydrogen chloride and to leave unaffected alkyl chlorides present of the group $CH_2ClCR_3$, and separating from the effluent of said treatment olefins and hydrogen chloride so produced.

15. In a process for producing derivatives of paraffin hydrocarbons, the improvement which comprises treating an alkyl halide mixture comprising a neoalkyl halide of the type $CH_2XCR_3$, where each R is any alkyl group of not more than four carbon atoms and where X is a halogen, along with other alkyl halides of approximately the same boiling point at a temperature between 175 and 500° C. for a period of time adapted to effect a decomposition of said other alkyl halides into olefins and hydrogen halide and to leave substantially unaffected said neoalkyl halide, and separating from the effluent of said treatment olefins and hydrogen halide so produced.

16. A process for preparing a neoalkyl monohalide in a relatively pure state, which comprises treating a paraffinic hydrocarbon material of a narrow boiling range and which comprises essentially a neoparaffin of the type $(CH_3)_3CR$, where R is any alkyl group of not more than four carbon atoms, with elementary chlorine to form alkyl chlorides, treating alkyl chlorides so formed at a temperature between 175 and 500° C. for a period of time adapted to effect a decomposition of other alkyl chlorides forming olefins and hydrogen chloride, and to leave substantially unaffected alkyl chlorides of the group $CH_2Cl(CH_3)_2CR$, and separating from the effluent of the treatment olefins and hydrogen chloride so produced.

17. In a process for producing derivatives of paraffin hydrocarbons, the improvement which comprises treating an alkyl chloride mixture, comprising a neoalkyl chloride of the type $CH_2ClCR_3$, where each R is any alkyl group of not more than four carbon atoms, along with at least one other alkyl chloride of the same molecular weight and having a hydrogen atom and a chlorine atom on adjacent carbon atoms, at a temperature between 175 and 500° C. for a period of time sufficient to effect a decomposition of said other alkyl chloride into an olefin and hydrogen chloride and to leave substantially unaffected said neoalkyl chloride, and separating from the effluent of said treatment olefin and hydrogen chloride so produced.

18. A process for producing a hexyl halide of the type $CH_2X(CH_3)_2CC_2H_5$, where X is a halogen, in a relatively pure state, which comprises treating a paraffinic hydrocarbon material of a narrow boiling range and comprising predominantly neohexane with an elementary halogen under such conditions that alkyl monohalides are formed, treating at least a portion of said alkyl monohalides at a temperature between 175 and 500° C., for a period of time such that said hexyl halide is substantially unaffected and other alkyl halides are decomposed forming olefin and hydrogen halide, and separating from the products of said treatment the said olefin and hydrogen halide so produced.

19. In a process for producing derivatives of paraffin hydrocarbons, the improvement which comprises treating an alkyl chloride mixture, comprising the hexyl chloride $CH_2Cl(CH_3)_2CC_2H_5$ along with at least one other hexyl chloride, at a temperature between 175 and 500° C. for a period of time sufficient to effect a decomposition of said other hexyl chloride into an olefin and hydrogen chloride and to leave said

$$CH_2Cl(CH_3)_2CC_2H_5$$

substantially unaffected, and separating from the effluent of said treatment olefin and hydrogen chloride so produced.

FREDERICK E. FREY.